(12) United States Patent
Nguyen

(10) Patent No.: US 6,922,760 B2
(45) Date of Patent: Jul. 26, 2005

(54) DISTRIBUTED RESULT SYSTEM FOR HIGH-PERFORMANCE WIDE-ISSUE SUPERSCALAR PROCESSOR

(75) Inventor: Hung T. Nguyen, Plano, TX (US)

(73) Assignee: LSI Logic Corporation, Milpitas, CA (US)

( * ) Notice: Subject to any disclaimer, the term of this patent is extended or adjusted under 35 U.S.C. 154(b) by 265 days.

(21) Appl. No.: 10/310,234

(22) Filed: Dec. 5, 2002

(65) Prior Publication Data
US 2004/0111568 A1 Jun. 10, 2004

(51) Int. Cl.[7] .............................................. G06F 12/00
(52) U.S. Cl. ....................... 711/154; 711/163; 711/167; 711/168
(58) Field of Search ................................. 711/154, 163, 711/167, 168

(56) References Cited

U.S. PATENT DOCUMENTS 5,349,677 A * 9/1994 Cray et al. ..................... 712/4
6,138,230 A * 10/2000 Hervin et al. ................ 712/216
6,732,336 B2 * 5/2004 Nystrom et al. ................ 716/1

* cited by examiner

Primary Examiner—Jack A. Lane
(74) Attorney, Agent, or Firm—Conley Rose, P.C.

(57) ABSTRACT

A system for handling distributed results in a high-performance wide-issue superscalar processor having result-forwarding capability is disclosed. The system generally includes buffer logic configured to produce write data and write information to a register file. The register file generally has a plurality of registers and is adapted to receive the write information, the write data, and read information. The register file also includes logic configured to produce the write data as read data output when the read information and the write information specify the same register. An embodiment of the disclosed register file includes multiple registers for storing data, read logic, correction logic, and muxing logic.

29 Claims, 4 Drawing Sheets

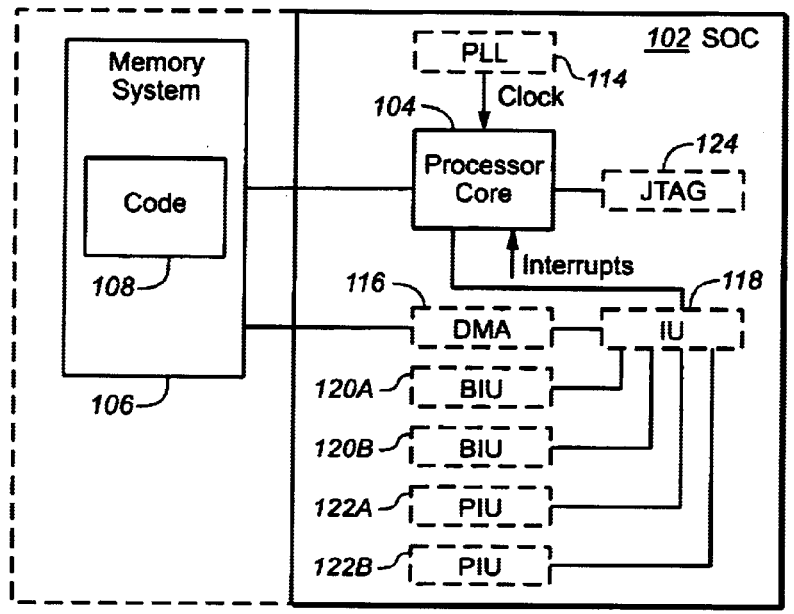
FIG._1
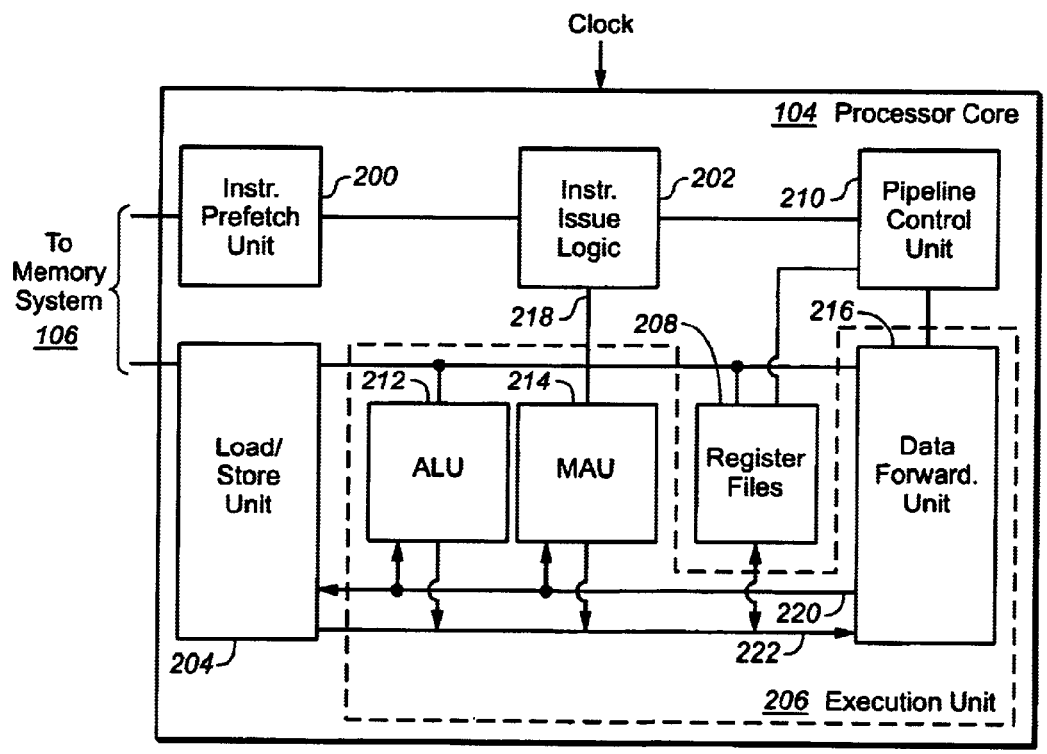
FIG._2

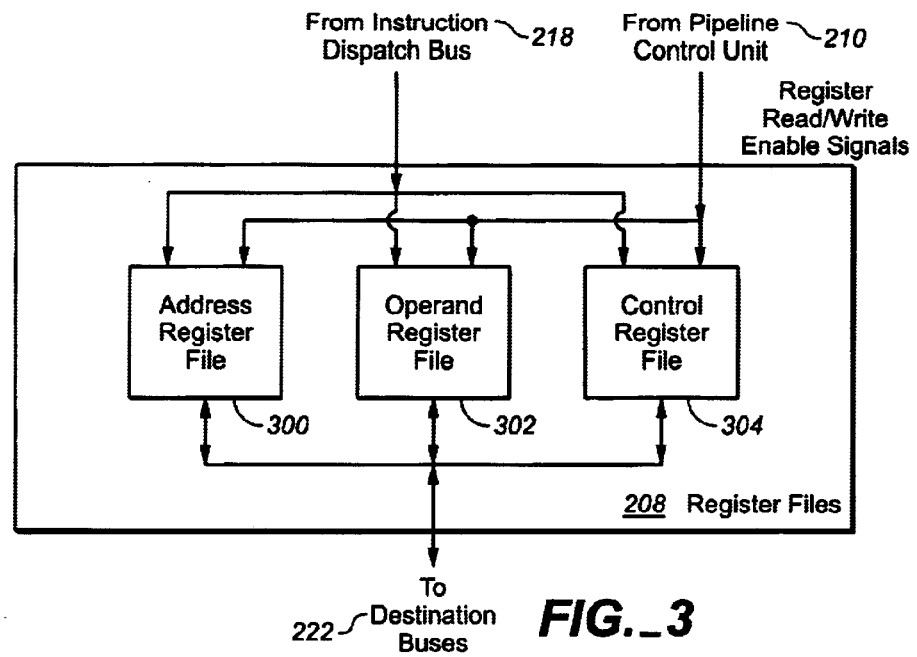
FIG._3
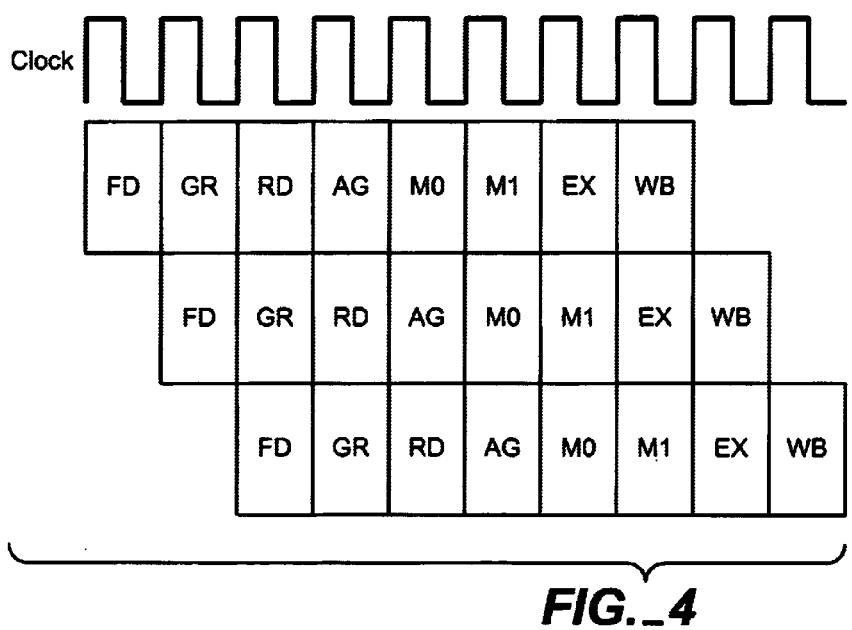
FIG._4

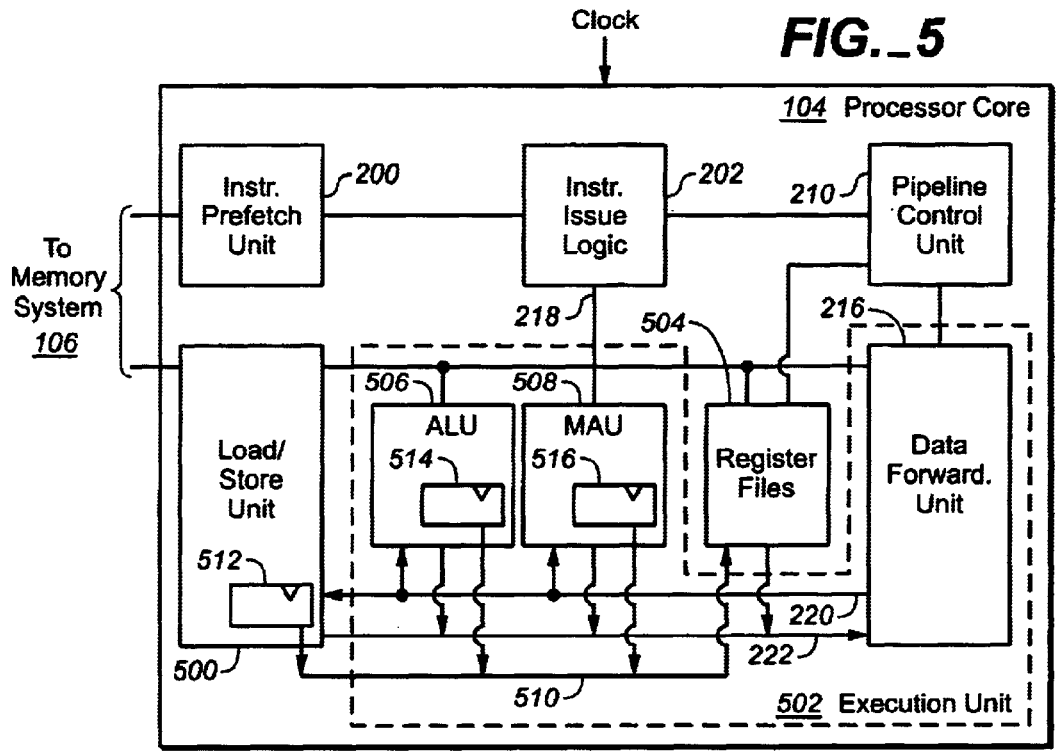
FIG._5
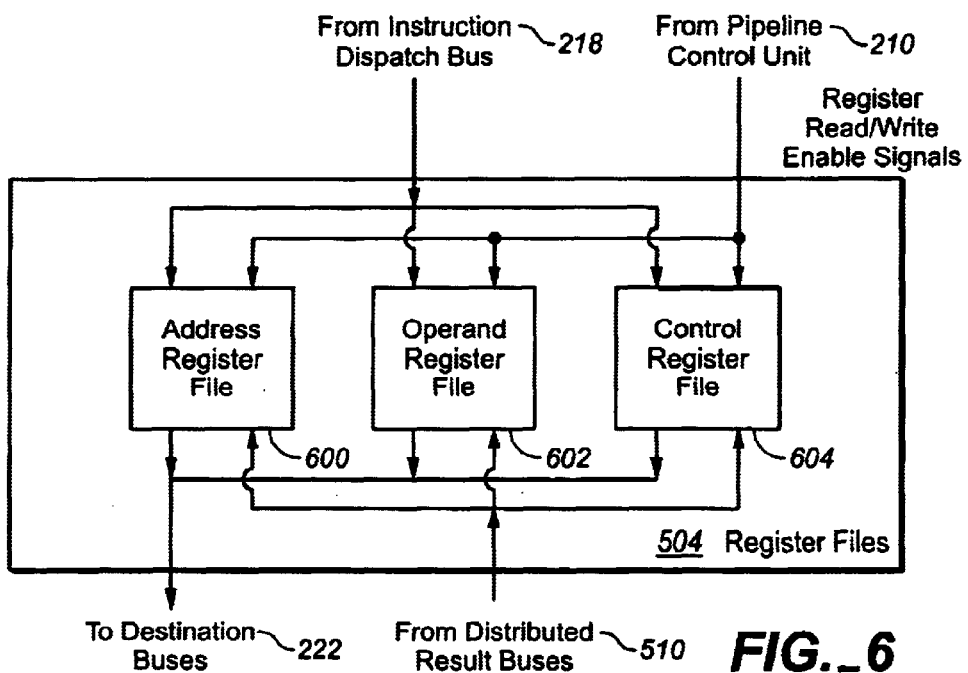
FIG._6

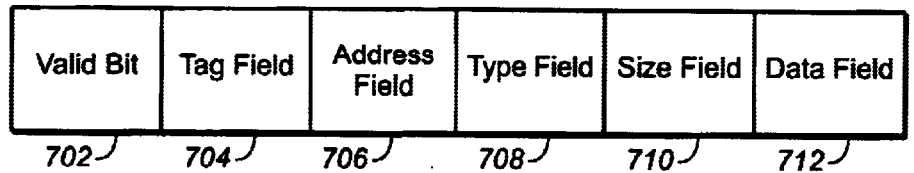
FIG._7
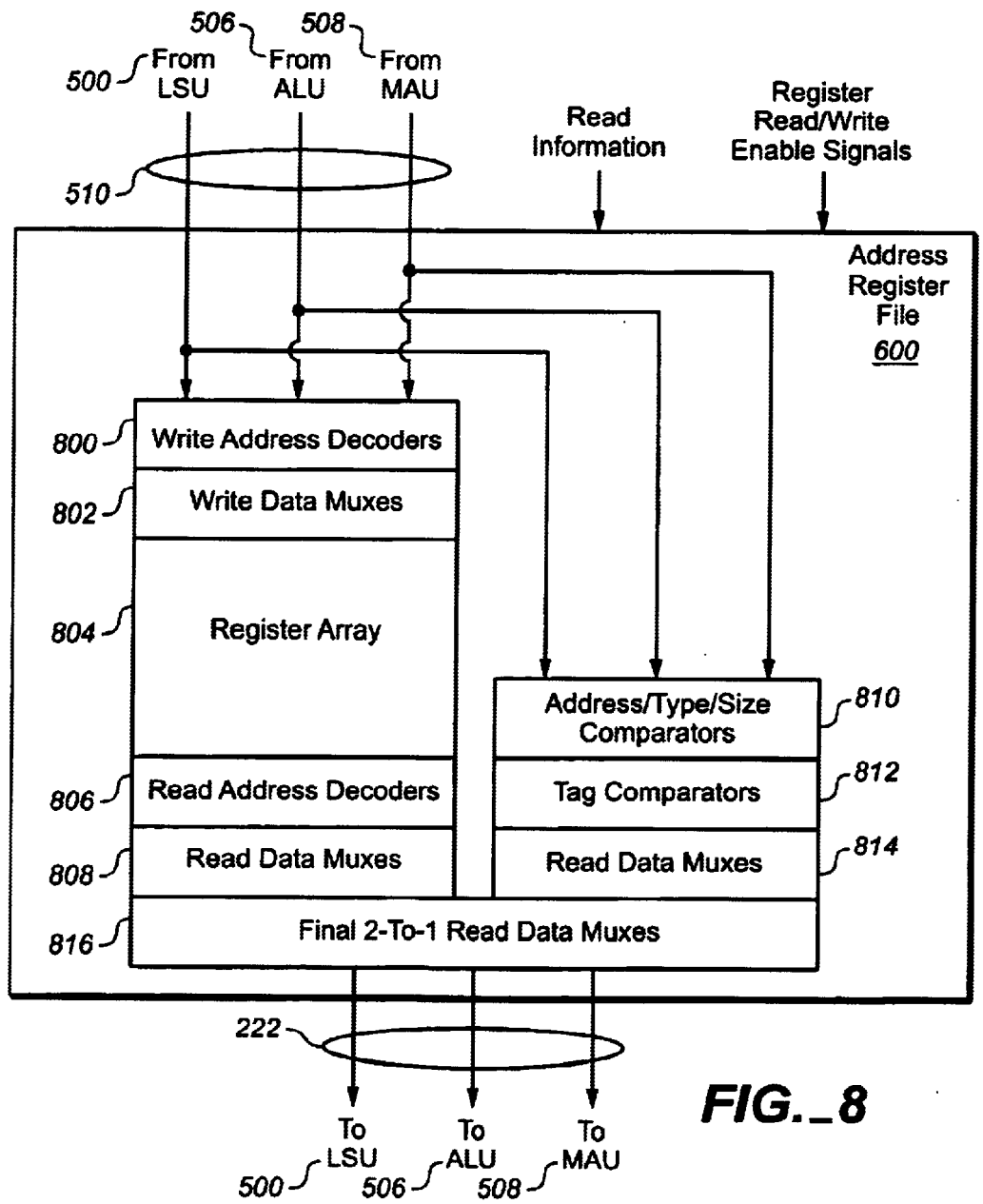
FIG._8

DISTRIBUTED RESULT SYSTEM FOR HIGH-PERFORMANCE WIDE-ISSUE SUPERSCALAR PROCESSOR

FIELD OF THE INVENTION

This invention relates generally to data processing, and, more particularly, to register files for storing data in processors configured to execute software program instructions.

BACKGROUND OF THE INVENTION

A typical processor inputs (i.e., fetches or receives) instructions from an external memory, and executes the instructions. Most instructions specify operations to be performed using one or more operands (i.e., data values). In general, operands may be included in the instructions themselves (i.e., immediate operands), or reside in either a register in the processor (i.e., register operands) or in an external memory coupled to the processor (i.e., memory operands).

Processor registers typically have unique addresses, and are often grouped together in register files. Some types of processors (e.g., digital signal processors) generally have multiple separate register files, e.g. address register files with address registers for storing address values, and data register files with data registers for storing data values.

Many modern processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units called pipeline stages. In the pipeline stages, corresponding steps of instruction execution are performed on different instructions independently, and intermediate results are passed to successive stages. By permitting the processor to overlap the executions of multiple instructions, pipelining allows the processor to execute more instructions per unit of time.

In general, a "scalar" processor issues instructions for execution one at a time, and a "superscalar" processor is capable of issuing multiple instructions for execution at the same time. A pipelined scalar processor concurrently executes multiple instructions in different pipeline stages; the executions of the multiple instructions are overlapped as described above. A pipelined superscalar processor, on the other hand, concurrently executes multiple instructions in different pipeline stages, and is also capable of concurrently executing multiple instructions in the same pipeline stage. Examples of pipelined superscalar processors include the popular Intel® Pentium® processors (Intel Corporation, Santa Clara, Calif.) and IBM® PowerPC® processors (IBM Corporation, White Plains, N.Y.).

Pipelining changes the relative timing of instructions by overlapping their executions. This deviation from completing an instruction before executing a subsequent instruction can result in certain problems. For example, instructions are often interdependent, and these dependencies often result in "pipeline hazards." Pipeline hazards result in stalls that prevent instructions from continually entering a pipeline at a maximum possible rate.

A "data dependency" is said to exist between two instructions when one of the instructions requires a value or data produced by the other. A "data hazard" occurs in a pipeline when a first instruction in the pipeline requires a value produced by a second instruction in the pipeline, and the value is not yet available. In this situation, the pipeline is typically stalled until the operation specified by the second instruction is completed and the needed value is produced.

For example, consider execution of the following consecutive instructions in a pipelined processor:

ADD R1,R2,R3

SUB R4,R1,R5 where the ADD instruction specifies an addition operation R1←R2+R3, and the SUB instruction specifies a subtraction operation R4←R1−R5. The register R1 is both a destination of the ADD instruction a source (i.e., operand) of the SUB instruction. Unless the subtraction operation is delayed until the addition operation is completed and the result is stored in the R1 register, the SUB instruction may read and use the wrong value of R1. In this situation, a data dependency exists between the ADD and SUB instructions, and a data hazard may occur in the processor as a result.

For example, assume the processor includes a register file including the registers R1–R5, an arithmetic logic unit (ALU) for performing addition and subtraction operations, and implements an execution pipeline including an execution stage and a subsequent write back stage. During the execution stage, operations specified by instructions are carried out, and the results are produced. During the subsequent write back stage, the results produced during the execution stage are stored in the register file. When the ADD instruction is in the execution stage, the ALU performs the addition operation, thereby producing a result to be stored in the R1 register during the subsequent write back stage. In order to obtain the correct R1 value from the register file, execution of the SUB instruction must be delayed such that the SUB instruction does not enter the execution stage until after the ADD instruction has completed the write back stage. The pipeline may have to be stalled in this situation, and in any case, an upper performance limit of the processor is reduced due to the required delay.

A hardware technique sometimes called "forwarding" (or "bypassing" or "short-circuiting") may be implemented in processors to avoid such data hazards. In the above-described processor, switching logic may be added between outputs of the register file and inputs of the ALU, and a bypass bus may be added between an output of the ALU and an input of the switching logic. The switching logic may be controlled to provide either an output of the register file, or a result previously computed by the ALU, to each input of the ALU. In the above example, the SUB instruction may enter the execution stage while the ADD instruction is in the write back stage. As a result, the required delay is reduced, and the upper performance limit of the processor is increased.

Many modern processors include multiple functional units, such as multiple ALUs. In processors including multiple functional units and implementing the above-described result forwarding technique, each bypass bus may be required to provide results produced by a functional unit to the switching logic of several functional units, as well as the register file. As the number of functional units is increased, and/or as the size of the register file is increased, the electrical load on each of the bypass buses can quickly become very large. While larger drivers could be used to drive the bypass buses, the amount of time required to accomplish result bypassing is almost certainly increased, and an upper performance limit of the processor is likely reduced.

SUMMARY OF THE INVENTION

A system for handling distributed results in a high-performance wide-issue superscalar processor having result-forwarding capability is disclosed. An embodiment of the system generally includes buffer logic configured to provide write data and write information to a register file. The register file generally has a plurality of registers and is adapted to receive the write information, the write data, and read information. The register file also includes logic configured to produce the write data as read data output when the read information and the write information specify the same register.

An embodiment of the register file is also disclosed including multiple registers for storing data, read logic, correction logic, and muxing logic. The read logic receives read information specifying one of the registers, accesses the register specified by the read information, and produces data obtained from the register specified by the read information as read data. The correction logic receives the read information along with write data and corresponding write information specifying one of the registers. The correction logic produces the write data as correction data, wherein the correction data is valid when the register specified by the write data is the same register specified by the read information. The muxing logic receives the read data from the read logic and the correction data from the correction logic, and produces the correction data as read data output when the correction data is valid.

BRIEF DESCRIPTION OF THE DRAWINGS

The invention may be understood by reference to the following description taken in conjunction with the accompanying drawings, in which like reference numerals identify similar elements, and in which:

FIG. 1 is a diagram of one embodiment of a data processing system including a system on a chip (SOC) having a processor core;

FIG. 2 is a diagram of one embodiment of the processor core of FIG. 1, wherein the processor core includes register files;

FIG. 3 is a diagram of one embodiment of the register files of FIG. 2;

FIG. 4 is a diagram illustrating an instruction execution pipeline implemented within the processor core of FIG. 2;

FIG. 5 is a diagram of a second embodiment of the processor core of FIG. 1, wherein the processor core includes register files, functional units, and distributed result buses for conveying results produced by the functional units to the register files;

FIG. 6 is a diagram of one embodiment of the register files of FIG. 5, wherein the register files includes an address register file;

FIG. 7 is a diagram of one embodiment of a format used to convey data via the distributed result buses of FIG. 5; and FIG. 8 is a diagram of one embodiment of the address register file of FIG. 6.

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

FIG. 1 is a diagram of one embodiment of a data processing system 100 including a system on a chip (SOC) 102 having a processor core 104. The processor core 104 executes instructions of a predefined instruction set. As indicated in FIG. 1, the processor core 104 receives a CLOCK signal and executes instructions dependent upon the CLOCK signal.

The processor core 104 is both a "processor" and a "core." The term "core" describes the fact that the processor core 104 is a functional block or unit of the SOC 102. It is now possible for integrated circuit designers to take highly complex functional units or blocks, such as processors, and integrate them into an integrated circuit much like other less complex building blocks. As indicated in FIG. 1, in addition to the processor core 104, the SOC 102 may include a phase-locked loop (PLL) circuit 114 that generates the CLOCK signal.

In the embodiment of FIG. 1, the processor core 104 is coupled to a memory system 106. The SOC 102 may also include a direct memory access (DMA) circuit 116 for accessing the memory system 106 substantially independent of the processor core 104. The SOC 102 may also include bus interface units (BIUs) 120A and 120B for coupling to external buses, and/or peripheral interface units (PIUs) 122A and 122B for coupling to external peripheral devices. An interface unit (IU) 118 may form an interface between the bus interfaces units (BIUs) 120A and 120B and/or the peripheral interface units (PIUs) 122A and 122B, the processor core 104, and the DMA circuit 116. The SOC 102 may also include a JTAG (Joint Test Action Group) circuit 124 including an IEEE Standard 1169.1 compatible boundary scan access port for circuit-level testing of the processor core 104. The processor core 104 may also receive and respond to external interrupt signals (i.e., interrupts) as indicated in FIG. 1.

In general, the memory system 106 stores data, wherein the term "data" is understood to include instructions. In the embodiment of FIG. 1, the memory system 106 stores a software program (i.e., "code") 108 including instructions from the instruction set. The processor core 104 fetches instructions of the code 108 from the memory system 106, and executes the instructions.

In the embodiment of FIG. 1, the instruction set includes instructions involving address and/or data operations as described above, wherein an address operation produces an address value (i.e., an address of a memory location in the memory system 106), and a data operation produces a data value. The instruction set also includes instructions specifying operands via the register indirectly with index register addressing mode, wherein the contents of two registers are added together to form an address of a memory location in the memory system 106, and the operand is obtained from the memory location using the address.

In the embodiment of FIG. 1, the processor core 104 implements a load-store architecture. That is, the instruction set includes load instructions used to transfer data from the memory system 106 to registers of the processor core 104, and store instructions used to transfer data from the registers of the processor core 104 to the memory system 106. Instructions other than the load and store instructions specify register operands, and register-to-register operations. In this manner, the register-to-register operations are decoupled from accesses to the memory system 106.

The memory system 106 may include, for example, volatile memory structures (e.g., dynamic random access memory structures, static random access memory structures, etc.) and/or non-volatile memory structures (read only memory structures, electrically erasable programmable read only memory structures, flash memory structures, etc.).

FIG. 2 is a diagram of one embodiment of the processor core 104 of FIG. 1. In the embodiment of FIG. 2, the processor core 104 includes an instruction prefetch unit 200, instruction issue logic 202, a load/store unit (LSU) 204, an execution unit 206, register files 208, and a pipeline control unit 210. In the embodiment of FIG. 2, the processor core 104 is a pipelined superscalar processor core. That is, the processor core 104 implements an instruction execution pipeline including multiple pipeline stages, concurrently executes multiple instructions in different pipeline stages, and is also capable of concurrently executing multiple instructions in the same pipeline stage.

In general, the instruction prefetch unit 200 fetches instructions from the memory system 106 of FIG. 1, and provides the fetched instructions to the instruction issue logic 202. In one embodiment, the instruction prefetch unit 200 is capable of fetching up to 8 instructions at a time from the memory system 106, partially decodes and aligns the instructions, and stores the partially decoded and aligned instructions in an instruction cache within the instruction prefetch unit 200.

The instruction issue logic 202 receives (or retrieves) partially decoded instructions from the instruction cache of the instruction prefetch unit 200, fully decodes the instructions, and stores the fully decoded instructions in an instruction queue. In one embodiment, the instruction issue logic 202 is capable of receiving (or retrieving) n partially decoded instructions (n>1) from the instruction cache of the instruction prefetch unit 200, and decoding the n partially decoded instructions, during a single cycle of the CLOCK signal. In one embodiment, the instruction issue logic 202 translates instruction operation codes (i.e., opcodes) into native opcodes for the processor. The instruction issue logic 202 checks the multiple decoded instructions using grouping and dependency rules, and provides (i.e., issues) one or more of the decoded instructions conforming to the grouping and dependency rules as a group to the execution unit 206 for simultaneous execution.

The LSU 204 is used to transfer data between the processor core 104 and the memory system 106 as described above. In the embodiment of FIG. 2, the LSU 204 includes 2 independent load/store units. The execution unit 206 is used to perform operations specified by instructions (and corresponding decoded instructions). In the embodiment of FIG. 2, the execution unit 206 includes an arithmetic logic unit (ALU) 212, a multiply-accumulate unit (MAU) 214, and a data forwarding unit (DFU) 216. The ALU 212 may include multiple independent ALUs, and the MAU 214 may include multiple independent MAUs.

The instruction issue logic 202 issues one or more decoded instructions as a group to the LSU 204, the ALU 212, and/or the MAU 214 via an instruction dispatch bus 218. The DFU 216 is also coupled to the instruction dispatch bus 218, and also receives the decoded instruction information via the instruction dispatch bus 218.

In general, the LSU 204, the ALU 212, and the MAU 214 receive operands from the instruction issue logic 202 (e.g., immediate operands), the register files 208 (e.g., register operands), the LSU 204 (e.g., memory operands), and/or the DFU 216 (e.g., forwarded results). The DFU 216 provides needed operands to the LSU 204 (including any independent LSUs therein), the ALU 212 (including any independent ALUs therein), and the MAU 214 (including any independent MAUs therein) via separate source buses referred to collectively as source buses 220. Results produced by the LSU 204 (including any independent LSUs therein), the ALU 212 (including any independent ALUs therein), and the MAU 214 (including any independent MAUs therein) are provided to the register files 208 and to the DFU 216 via separate destination buses referred to collectively as destination buses 222. For example, results produced by each of the independent LSUs of the LSU 204 are provided to the register files 208 and the DFU 216 via different destination buses of the destination buses 222, and results produced by each of the independent ALUs of the ALU 212 are provided to the register files 208 and the DFU 216 of FIG. 2 via different destination buses of the destination buses 222. The register files 208, described in more detail below, include multiple register files of the processor core 104. In general, the pipeline control unit 210 controls the instruction execution pipeline described in more detail below.

FIG. 3 is a diagram of one embodiment of the register files 208 of FIG. 2. In the embodiment of FIG. 3, the register files 208 includes an address register file 300 including multiple address registers, an operand register file 302 including multiple operand (i.e., data) registers, and a control register file 304 including multiple control registers. In general, the control registers of the control register file 304 are used to store control information used for system mode control (e.g., address mode control, data mode control, processor status, and flag information).

In general, the address registers of the address register file 300 are used to store address information used to produce an address result (i.e., an address of a memory location in the memory system 106 of FIG. 1). For example, in an add instruction "ADD Ax,Ny" the 'Ax' may specify an address register x of the address register file 300, and the 'Ny' may specify an index register y of the address register file 300. During execution of the add instruction "ADD Ax,Ny," an index value stored in the Ny index register may be added to a base address value stored in the Ax address register, and the address result may be stored in the Ax register. In this situation, following execution of the add instruction "ADD Ax,Ny," the Ax register contains an address of a memory location in a memory (e.g., in an external memory coupled to the processor). The add instruction "ADD Ax,Ny" performs an address operation and produces an address result.

In general, the operand (i.e., data) registers of the operand register file 302 are used to store data used to produce a data result. For example, in an add instruction "ADD Rx,--" the 'Rx' may specify an operand (i.e., data or general purpose) register x of the operand register file 302, and the '--' may specify another operand (e.g., an immediate operand or a register operand stored in another operand register of the operand register file 302). During execution of the add instruction "ADD Rx,--," a data value stored in the Rx register may be added to a data value of the other operand specified by the '--,' and the data result may be stored in the Rx register. In this situation, following execution of the add instruction "ADD Rx,--," the Rx register contains the data result. The add instruction "ADD Rx,--" performs a data operation and produces a data result.

In one embodiment of the processor core 104 of FIG. 2, different opcodes are assigned to instructions producing address results and data results An opcode of the add instruction "ADD Ax,Ny" differs from an opcode of, for example, an add instruction "ADD Rx,--" wherein '--' specifies an operand and the add instruction "ADD Rx,--" produces a data result stored in a "data" register Rx (e.g., a general purpose register Rx).

As indicated in FIG. 3, the address register file 300, the operand register file 302, and the control register file 304 are coupled to receive information from the instruction dispatch bus 218 of FIG. 2, and to receive read/write enable signals from the pipeline control unit 210 of FIG. 2. In general, the address register file 300, the operand register file 302, and the control register file 304 are accessed in response to the read/write enable signals. The address register file 300, the operand register file 302, and the control register file 304 are also coupled to receive information from, and to provide information to, the destination buses 222. For example, results produced by each of the independent LSUs of the LSU 204 of FIG. 2 are provided to the address register file 300, the operand register file 302, and the control register file 304 via different destination buses of the destination buses 222, and the address register file 300, the operand register file 302, and the control register file 304 drive read data output on destination buses of the destination buses 222.

Referring to FIGS. 2 and 3, during the reading of data (e.g., operand data) from one of the register files of the register files 208 (e.g., the address register file 300, the operand register file 302, or the control register file 304), the instruction issue logic 202 provides read information to the register file via the instruction dispatch bus 218, and the pipeline control unit 210 provides a read enable signal to the register file. The register file produces read data in response to the read information and the read enable signal, and provides the read data to the DFU 216 via one of the destination buses 222. Muxing logic within the DFU 216 electrically couples the destination bus to one of the source buses 220, thus routing the read data to one of the functional units (e.g., of the LSU 204, the ALU 212, or the MAU 214).

During the writing of data (e.g., result data) from one of the functional units (e.g., of the LSU 204, the ALU 212, or the MAU 214) to one of the register files of the register files 208 (e.g., the address register file 300, the operand register file 302, or the control register file 304), the functional unit provides the write data and corresponding write information to the register file via a corresponding one of the destination buses 222, and the pipeline control unit 210 provides a write enable signal to the register file. The register file stores the write data in a register specified by the write information in response to the write data, the write information, and the write enable signal.

Result forwarding is also implemented in the processor core 104 of FIG. 2. During the writing of result data from one of the functional units (e.g., of the LSU 204, the ALU 212, or the MAU 214) to one of the register files of the register files 208 (e.g., the address register file 300, the operand register file 302, or the control register file 304), the DFU 216 also receives the result data via one of the destination buses 222. When result forwarding is needed, the muxing logic of the DFU 216 electrically couples the destination bus conveying the result to one or more of the source buses 220, thus forwarding the result to one or more of the functional units via the source buses 220.

FIG. 4 is a diagram illustrating the instruction execution pipeline implemented within the processor core 104 of FIG. 2. The instruction execution pipeline (pipeline) allows overlapped execution of multiple instructions. In the embodiment of FIG. 4, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WB) stage. As indicated in FIG. 4, operations in each of the 8 pipeline stages are completed during a single cycle of the CLOCK signal.

Referring to FIGS. 1, 2, and 4, the instruction fetch unit 200 fetches several instructions (e.g., up to 8 instructions) from the memory system 106 during the fetch/decode (FD) pipeline stage, partially decodes and aligns the instructions, and provides the partially decoded instructions to the instruction issue logic 202. The instruction issue logic 202 fully decodes the instructions and stores the fully decoded instructions in an instruction queue (described more fully later). The instruction issue logic 202 also translates the opcodes into native opcodes for the processor.

During the grouping (GR) stage, the instruction issue logic 202 checks the multiple decoded instructions using grouping and dependency rules, and passes one or more of the decoded instructions conforming to the grouping and dependency rules on to the read operand (RD) stage as a group. During the read operand (RD) stage, any operand values, and/or values needed for operand address generation, for the group of decoded instructions are obtained from the register files 208.

During the address generation (AG) stage, any values needed for operand address generation are provided to the LSU 204, and the LSU 204 generates internal addresses of any operands located in the memory system 106. During the memory address 0 (M0) stage, the LSU 204 translates the internal addresses to external memory addresses used within the memory system 106.

During the memory address 1 (M1) stage, the LSU 204 uses the external memory addresses to obtain any operands located in the memory system 106. During the execution (EX) stage, the execution unit 206 uses the operands to perform operations specified by the one or more instructions of the group. During a final portion of the execution (EX) stage, valid results (including qualified results of any conditionally executed instructions) are stored in registers of the register files 208.

During the write back (WB) stage, valid results (including qualified results of any conditionally executed instructions) of store instructions, used to store data in the memory system 106 as described above, are provided to the LSU 204. Such store instructions are typically used to copy values stored in registers of the register files 208 to memory locations of the memory system 106.

In the embodiment of the processor core 104 of FIG. 2, the DFU 216 carries out result forwarding during result writes to register files by electrically coupling the destination bus of the destination buses 222 conveying the result to one or more source buses of the source buses 220, thus forwarding the result to one or more functional units (e.g., of the LSU 204, the ALU 212, and/or the MAU 214). In the process, an electrical load presented to a driver of the destination bus by the destination bus and the register file is increased by a variable number of source buses. While it might be possible to increase the sizes of the drivers, the amount of time required to accomplish the result forwarding is almost certainly increased, and an upper performance limit of the processor core 104 is likely reduced.

FIG. 5 is a diagram of a second embodiment of the processor core 104 of FIG. 1. Components of the embodiment of the processor core 104 of FIG. 5 that are similar to those of the embodiment of the processor core 104 of FIG. 2 and described above are numbered similarly in FIG. 5. Like the embodiment of FIG. 2, the processor core 104 of FIG. 5 is a pipelined superscalar processor core, and implements the instruction execution pipeline illustrated in FIG. 4 and described above.

In the embodiment of FIG. 5, the processor core 104 includes a load/store unit (LSU) 500, an execution unit 502, and register files 504. The LSU 500 is used to transfer data between the processor core 104 and the memory system 106 of FIG. 1. In the embodiment of FIG. 5, the LSU 500 includes 2 independent load/store units. The execution unit 502 is used to perform operations specified by instructions (and corresponding decoded instructions). In the embodiment of FIG. 5, The execution unit 502 includes an arithmetic logic unit (ALU) 506, a multiply-accumulate unit (MAU) 508, and the data forwarding unit (DFU) 216 described above. The ALU 506 includes 2 independent ALUs, and the MAU 508 includes 2 independent MAUs.

In the embodiment of the processor core 104 of FIG. 5, the instruction issue logic 202 decodes instructions and determines what resources within the execution unit 502 are required to execute the instructions. The instruction issue logic 202 checks the decoded instructions using grouping and dependency rules, and provides (i.e., issues) one or more of the decoded instructions conforming to the grouping and dependency rules as a group to the execution unit 502 for simultaneous execution.

The instruction issue logic 202 issues one or more decoded instructions as a group to the LSU 500, the ALU 506, and/or the MAU 508 via the instruction dispatch bus 218. The LSU 500, the ALU 506, and the MAU 508 receive operands from the instruction issue logic 202 (e.g., immediate operands), the register files 504 (e.g., register operands), the LSU 500 (e.g., memory operands), and/or the DFU 216 (e.g., forwarded results). The DFU 216 provides needed operands to the LSU 500, the ALU 506, and the MAU 508 via the source buses 220 as described above. The register files 504, described in more detail below, includes multiple register files of the processor core 104.

Results produced by the LSU 500, the ALU 506, and the MAU 508 are provided to the DFU 216 via the destination buses 222 as described above, and to the register files 504 via separate distributed result buses referred to collectively as distributed result buses 510. As described above, the LSU 500 includes 2 independent LSUs. In FIG. 5, a clocked register symbol 512 within the LSU 500 symbolically represents buffer logic within each of the independent LSUs of the LSU 500. In general, results produced by the independent LSUs are stored in a clocked register of the buffer logic before being driven upon the corresponding distributed result bus of the distributed result buses 510. Accordingly, result data driven upon the corresponding distributed result bus of the distributed result buses 510 is delayed in time by one cycle of the CLOCK signal of FIG. 2.

Similarly, as described above, the ALU 506 includes 2 independent ALUs, and the MAU 508 includes 2 independent MAUs. In FIG. 5, a clocked register symbol 514 within the ALU 506 symbolically represents buffer logic within each of the independent ALUs of the ALU 506, and a clocked register symbol 516 within the MAU 508 symbolically represents buffer logic within each of the independent MAUs of the MAU 508. In general, results produced by the independent ALUs and MAUs are stored in a clocked register of the buffer logic before being driven upon the corresponding distributed result bus of the distributed result buses 510. Accordingly, result data driven upon the corresponding separate distributed result buses of the distributed result buses 510 is delayed in time by one cycle of the CLOCK signal of FIG. 2.

FIG. 6 is a diagram of one embodiment of the register files 504 of FIG. 5. In the embodiment of FIG. 6, the register files 504 includes an address register file 600 including multiple address registers, an operand register file 602 including multiple operand (i.e., data) registers, and a control register file 604 including multiple control registers. In general, the address registers of the address register file 600 are used to store address information used to produce an address result (i.e., an address of a memory location in the memory system 106 of FIG. 1), the operand (i.e., data) registers of the operand register file 602 are used to store data used to produce a data result, and the control registers of the control register file 604 are used to store control information used for system mode control (e.g., address mode control, data mode control, processor status, and flag information). As described above, different opcodes are assigned to instructions producing address results and data results.

As indicated in FIG. 6, the address register file 600, the operand register file 602, and the control register file 604 are coupled to receive information via the instruction dispatch bus 218, and to provide information via the destination buses 222 of FIG. 5. The address register file 600, the operand register file 602, and the control register file 604 are also coupled to receive information via the distributed result buses 510 of FIG. 5 (i.e., result information delayed in time by one cycle of the CLOCK signal), and to receive read/write enable signals from the pipeline control unit 210. In general, the address register file 600, the operand register file 602, and the control register file 604 are accessed in response to the read/write enable signals.

Referring to FIGS. 5 and 6, during the reading of data (e.g., operand data) from one of the register files of the register files 504 (e.g., the address register file 600, the operand register file 602, or the control register file 604), the instruction issue logic 202 provides read information to the register file via the instruction dispatch bus 218, and the pipeline control unit 210 provides a read enable signal to the register file. The register file produces read data in response to the read information and the read enable signal, and provides the read data to the DFU 216 via one of the destination buses 222. The muxing logic within the DFU 216 electrically couples the destination bus to one of the source buses 220, thus routing the read data to one of the functional units (e.g., of the LSU 500, the ALU 506, or the MAU 508).

During the writing of data (e.g., result data) from one of the functional units (e.g., of the LSU 500, the ALU 506, or the MAU 508) to one of the register files of the register files 504 (e.g., the address register file 600, the operand register file 602, or the control register file 604), the functional unit provides the write data and corresponding write information to the register file via one of the distributed result buses 510. As described above, the write data and the corresponding write information is delayed in time by one cycle of the CLOCK signal. The pipeline control unit 210 provides a write enable signal to the register file. The register file stores the write data in a register specified by the write information in response to the write data, the write information, and the write enable signal.

Result forwarding is also implemented in the processor core 104 of FIG. 5. While the result data is being stored in a register before being driven on one of the distributed result buses 508, the functional unit producing the result drives the write data and the corresponding write information on one of the destination buses 222. The DFU 216 receives the write data and the corresponding write information via the destination bus. When result forwarding is needed, the muxing logic of the DFU 216 electrically couples the destination bus conveying the result to one or more of the source buses 220, thus forwarding the result to one or more of the functional units via the source buses 220.

Referring back to FIG. 5, in the embodiment of the processor core 104 of FIG. 5, the DFU 216 carries out result forwarding separate from result writes to register files. As in the embodiment of the processor core 104 of FIG. 2, the DFU 216 carries out result forwarding by electrically coupling a destination bus of the destination buses 222 conveying a result to one or more source buses of the source buses 220, thus forwarding the result to one or more functional units (e.g., of the LSU 500, the ALU 506, and/or the MAU 508). However, in the processor core 104 of FIG. 5, an electrical load presented to a driver of the destination bus does not include the relatively large electrical load of the register file. Accordingly, result forwarding can be accomplished in less time, and an upper performance level of the processor core 104 of FIG. 5 is increased over that of the processor core 104 of FIG. 2.

FIG. 7 is a diagram of one embodiment of a format 700 used to convey data via each of the distributed result buses 510 of FIG. 5. In one embodiment, the buffer logic within the independent functional units of the LSU 500, the ALU 506, and the MAU 508 of FIG. 5, represented by the clocked register symbols 512, 514, and 516 of FIG. 5, drives the distributed result buses 510 with data formatted according to the format 700.

In the embodiment of FIG. 7, the format 700 includes a valid bit 702, a tag field 704, an address field 706, a type field 708, a size field 710, and a data field 712. The valid bit 702 has a value that indicates whether the data is valid. For example, the data may be valid if the valid bit 702 is a '1,' and not valid if the valid bit 702 is a '0.'

In the embodiment of the format 700, a value in the tag field 704 represents a relative order of a corresponding instruction grouped together with other instructions for simultaneous execution. In the embodiment of the processor core 104 of FIGS. 2 and 5, the instruction issue logic 202 groups up to 6 instructions together during the grouping (GR) pipeline stage, and issues the instructions to the execution unit for simultaneous execution via the instruction dispatch bus 218. When grouping the instructions, the instruction issue logic 202 assigns a 3-bit tag to each of the instructions of the group. Each 3-bit tag has a binary value indicating a relative order of the instructions in the code 108 of FIG. 1. In the embodiment of FIGS. 2 and 5, a lowest-valued tag '000' is assigned to an instruction that precedes all the other instructions of the group in the code 108 (i.e., to an earliest instruction of the group). The instruction issue logic 202 assigns a highest-valued tag to an instruction that follows all of the other instructions of the group in the code 108 (i.e., to a latest instruction of the group). For example, when the instruction issue logic 202 manages to group 6 instructions together for simultaneous execution, the instruction issue logic 202 assigns a highest-valued tag '101' to an instruction that follows all of the other instructions of the group in the code 108 (i.e., to a latest instruction of the group). In the embodiment of the format 700 of FIG. 7, the tag field 704 contains the 3-bit tag assigned to the instruction producing the data by the instruction issue logic 202 when the instruction issue logic 202 grouped the instruction with other instructions for simultaneous execution.

In the embodiment of the format 700, the address field 706 contains the address of a register of the register file 504 to be used. In the embodiments of FIGS. 2 and 5, there is a maximum of 64 registers in any one of the register files of the processor core 104. Accordingly, in the embodiment of the format 700 of FIG. 7, the address field 706 is a 6-bit field for storing a binary value uniquely identifying one of up to 64 registers of a register file.

In the embodiment of the format 700, the type field 708 identifies the type of register to be used. In the embodiments of FIGS. 2 and 5, the processor core 104 includes 3 different types of registers described above: address registers 'Ax,' index registers 'Nx,' and general purpose (i.e., operand) registers 'Rx.' More specifically, an architecture of the processor core 104 of FIGS. 2 and 5 specifies 64 16-bit general purpose (i.e., operand) registers R0–R63, 16 32-bit address registers A0–A15, and 16 16-bit index registers N0–N15. Accordingly, in the embodiment of the format 700 of FIG. 7, the type field 708 is a 2-bit field for storing a binary value uniquely identifying the type of the register in which the data is to be stored. For example, when the type field 708 contains '00,' the register in which the data is to be stored may be one of the general purpose (i.e., operand) registers 'Rx.' When the type field 708 contains '01' the register in which the data is to be stored may be one of the index registers 'Nx,' and when the type field 708 contains '10' the register in which the data is to be stored may be one of the address registers 'Ax.'

In the embodiment of the format 700, the size field 710 identifies the length of the data to be handled. In the embodiments of FIGS. 2 and 5, the processor core 104 handles data values having 4 different lengths or sizes: 8-bit values, 16-bit values, 32-bit values, and 40-bit values. Accordingly, in the embodiment of the format 700 of FIG. 7, the size field 710 is a 2-bit field for storing a binary value uniquely identifying a length of the data in bits. For example, when the size field 710 contains '00,' the data may be a 16-bit value, and when the size field 710 contains '01' the data may be a 32-bit value. When the size field 710 contains '10' the data may be a 40-bit value, and when the size field 710 contains '11' the data may be an 8-bit value. Finally, in the embodiment of the format 700 of FIG. 7, the data field 712 is a 40-bit field for storing a binary representation of the data up to 40 bits long.

FIG. 8 is a diagram of one embodiment of the address register file 600 of FIG. 6. In the embodiment of FIG. 8, the address register file 600 includes write address decoders 800, write data multiplexers (muxes) 802, a register array 804, read address decoders 806, read data multiplexers (muxes) 808, address/type/size comparators 810, tag comparators 812, read data multiplexers (muxes) 814, and final 2-to-1 read data multiplexers (muxes) 816.

In the embodiment of FIG. 8, the register array 804 contains the 16 32-bit address registers A0–A15 and the 16 16-bit index registers N0–N15 specified by the architecture of the processor core 104 of FIGS. 2 and 5. The write address decoders 800 receive write data and corresponding write information, formatted per the format 700 of FIG. 7, from the LSU 500, the ALU 506, and the MAU 508 via the separate distributed result buses of the distributed result buses 510 of FIG. 5.

The write address decoders 800 and the write data muxes 802 are used to access a register of the register array 804 specified by the write information during a write operation, and to store the write data in the register specified by the write information during the write operation. In the embodiment of FIG. 8, the write data is stored in the register specified by the write information during the same cycle of the CLOCK signal of FIG. 5 in which the write data and corresponding write information is received.

The read address decoders 806 and the read data muxes 808 are used to access the registers of the register array 804 during read operations. During a read operation to obtain data (e.g., operand data) from a register of the address register file 600, the instruction issue logic 202 provides read information specifying the register to the address register file 600 via the instruction dispatch bus 218, and the pipeline control unit 210 provides a read enable signal to the address register file 600. In the embodiment of FIG. 8, the read information includes a 6-bit register address, a 2-bit value identifying the type of the register, and a 2-bit value identifying a size of the data (i.e., a length of the data in bits). The address register file 600 provides the read data to the DFU 216 via one of the destination buses 222 as indicated in FIG. 8 during the same cycle of the CLOCK signal of FIG. 5 in which the read information is received. As described above, the muxing logic within the DFU 216 electrically couples the destination bus to one of the source buses 220 of FIG. 5, thus routing the read data to one of the functional units (e.g., of the LSU 500, the ALU 506, or the MAU 508).

In effect, the address/type/size comparators 810, the tag comparators 812, the read data muxes 814, and the final 2-to-1 read data muxes 816 constitute "correction logic." As write data and corresponding write information received via the distributed result buses 510 of FIG. 5 is delayed by one cycle of the CLOCK signal of FIG. 5, the address/type/size comparators 810, the tag comparators 812, and the read data muxes 814 are used to determine if a newer "correct" value of a register specified by read information is arriving via the distributed result buses 510. If so, the newer value arriving via the distributed result buses 510 should be provided instead of an outdated "incorrect" value retrieved from the register array 804 via the read address decoders 806 and the read data muxes 808.

In general, the address/type/size comparators 810 are used to compare address, type, and size information received from the instruction issue logic 202 as part of a read request to the respective contents of the address field 706, the type field 708, and the size field 710 of valid results arriving from the LSU 500, the ALU 506, and the MAU 508 via the distributed result buses 510 in order to identify any matching valid results. In the event there are several matching valid results, the tag comparators 812 are used to compare the tag fields 704 of the matching valid results in order to produce the matching valid result having the highest-valued tag field 704 (i.e., the latest matching valid result).

If the address, type, and size information received from the instruction issue logic 202 as part of the read request matches the respective contents of the address field 706, the type field 708, and the size field 710 of more than one of the valid results arriving from the LSU 500, the ALU 506, and the MAU 508 via the distributed result buses 510, the tag comparators 812 compare the tag fields 704 of the matching valid results. The address/type/size comparators 810 and the tag comparators 812 produce control signals provided to the read data muxes 814. The control signals cause the read data muxes 814 to produce the contents of the data field 712 of the matching valid result having the highest-valued tag field 704 (i.e., the latest matching valid result) to an input of the final 2-to-1 read data muxes 816.

The read data muxes 808 provide the data stored in the register of the register array 804 identified by the read information received from the instruction issue logic 202 to another input of the final 2-to-1 read data muxes 816. If no valid result arriving from the LSU 500, the ALU 506, and the MAU 508 via the distributed result buses 510 updates the register identified by the read request, the final 2-to-1 read data muxes 816 provide the value produced by the read data muxes 808 (i.e., the value retrieved from the register array 804) to the LSU 500, the ALU 506, or the MAU 508 via the corresponding one of the destination buses 222 as indicated in FIG. 8 and described above.

On the other hand, if a valid result arriving from the LSU 500, the ALU 506, and the MAU 508 via the distributed result buses 510 updates the register identified by the read request, the final 2-to-1 read data muxes 816 provide the value produced by the read data muxes 814 (i.e., the latest matching valid result) to the LSU 500, the ALU 506, or the MAU 508 via the corresponding one of the destination buses 222 as indicated in FIG. 8 and described above.

It should be noted that the operand register file 602 of FIG. 6 and/or the control register file 604 of FIG. 6 may also be configured similarly to the embodiment of the address register file 600 shown in FIG. 8.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A register file system, comprising:
   a plurality of registers for storing data;
   read logic adapted to receive read information specifying one of the registers, wherein the read logic is configured to access the register specified by the read information and to produce data obtained from the register specified by the read information as read data;
   write logic adapted to receive write information and corresponding write data, wherein the write logic is configured to store the write data in the register specified by the write information;
   correction logic configured to produce the write data as read data output when the read information and the write information specify the same register, the correction logic comprising logic configured to produce the write data as correction data; and muxing logic coupled to receive the read data from the read logic and the correction data from the correction logic, said muxing logic configured to produce the correction data as the read data output when the correction data is valid;

wherein the correction data is valid when the register specified by the write information is the same register specified by the read information.

2. The system as recited in claim 1, wherein the write data and the corresponding write information are delayed in time with respect to the read information such that when the register specified by the write data is the same register specified by the read information, the data obtained from the register specified by the read information is outdated, and the write data is current.

3. The system as recited in claim 2, wherein the write data and the corresponding write information are delayed in time with respect to the read information by one cycle of a synchronizing clock signal.

4. The system as recited in claim 1, wherein the correction logic is configured to produce the read data as the read data output when the read information and the write information do not specify the same register.

5. The system as recited in claim 1, wherein the read logic receives the read information and the correction logic produces the read data output in response to the read information during a single cycle of a clock signal.

6. The system as recited in claim 1, wherein the muxing logic is configured to produce the read data as the read data output when the correction data is not valid.

7. The system as recited in claim 1, wherein the write logic receives the write data and the corresponding write information, and stores the write data in the register specified by the write information, during a single cycle of a clock signal.

8. The system as recited in claim 1, wherein the read information comprises address information specifying an address of one of the registers.

9. The system as recited in claim 1, wherein the read information comprises type information specifying a register type of one of the registers.

10. The system as recited in claim 1, wherein the read information comprises size information specifying a data length in bits.

11. A processor, comprising;
a functional unit configured to perform at least one function of the processor;
a register file coupled to the functional unit, comprising:
a plurality of registers for storing data;
read logic coupled to receive read information specifying one of the registers, and wherein the read logic is configured to access the register specified by the read information and to produce data obtained from the register specified by the read information as read data;
correction logic coupled to receive: (i) the read information, and (ii) write data and corresponding write information from the at least one functional unit, wherein the write information specifies one of the registers, and wherein the correction logic is configured to produce the write data as correction data, and wherein the correction data is valid when the register specified by the write data is the same register specified by the read information; and
muxing logic coupled to receive the read data from the read logic and the correction data from the correction logic, and configured to produce the read data as read data output when the correction data is not valid.

12. The processor as recited in claim 11, wherein operations of the at least one functional unit and the register file are synchronized by a common clock signal.

13. The processor as recited in claim 12, wherein the write data and the corresponding write information are delayed in time with respect to the read information by a cycle of the clock signal such that when the register specified by the write data is the same register specified by the read data, the data obtained from the register specified by the read information is outdated, and the write data is current.

14. The processor as recited in claim 11, wherein the register file further comprises:
write logic coupled to receive the write data and the corresponding write information, wherein the write logic is configured to store the write data in the register specified by the write information.

15. The processor as recited in claim 11, wherein the read information comprises address information specifying an address of one of the registers.

16. The processor as recited in claim 11, wherein the read information comprises type information specifying a register type of one of the registers.

17. The processor as recited in claim 11, wherein the read information comprises size information specifying a data length in bits.

18. The processor as recited in claim 11, wherein the processor comprises a plurality of functional units, and wherein instructions are grouped together within the processor for simultaneous execution, and wherein the write information comprises tag information specifying a relative order of an instruction producing the write data in a group of instructions executed simultaneously within the processor.

19. The processor as recited in claim 18, wherein the wherein the correction logic is configured to produce write data received from one of the functional units as the correction data dependent upon the tag information.

20. The processor as recited in claim 11, further comprising a distributed result bus for conveying the write data and the corresponding write information from the at least one functional unit to the register file.

21. The processor as recited in claim 20, wherein the at least one functional unit comprises buffer logic for driving the write data and the corresponding write information on the distributed result bus, and wherein the buffer logic comprises a register controlled by a clock signal.

22. A processor, comprising:
buffer logic configured to produce write data and corresponding write information;
a register file comprising a plurality of registers and adapted to: (i) receive read information, (ii) receive the write data and the corresponding write information, (iii) produce the write data as a first output, (iv) store the write data as read data, (v) produce the read data as a second output; and
muxing logic adapted to receive the read information, the write information, the first output and the second output, the muxing logic configured to produce the first output as a read data output when the read information and the write information specify the same register and configured to produce the second output as the read output when the read information and the write information specify different registers.

23. The processor as recited in claim 22, wherein operations of the buffer logic and the register file are synchronized by a common clock signal.

24. The processor as recited in claim 23, wherein the write data and the corresponding write information are delayed in time with respect to the read information by a cycle of the clock signal.

25. The processor as recited in claim 22, wherein the register file comprises read logic configured to access the register specified by the read information and to obtain read data from the register specified by the read information.

26. The processor as recited in claim 22, further comprising a functional unit configured to perform at least one predefined function thereby producing a result, wherein the buffer logic is coupled to receive the result and configured to produce the write data and the corresponding write information dependent upon the result.

27. The processor as recited in claim 22, further comprising a distributed result bus for conveying the write data and the corresponding write information from the buffer logic to the register file.

28. A method for operating a register file, comprising:
   receiving: (i) read information, and (ii) write data and corresponding write information, wherein the read information and the write information both specify one of a plurality of registers of the register file;
   producing the write data as a first data output;
   storing the write data as read data;
   producing the read data as a second data output;
   selecting, between said first data output and said second data output, said first data output as a read data output if the read information and the write information specify the same register; and
   selecting, between said first data output and said second data output, said second data output as said read data output if the read information and the write information specify different registers.

29. The method as recited in claim 28, wherein the write data and the corresponding write information are delayed in time with respect to the read information by one cycle of a clock signal.

* * * * *